United States Patent [19]

Matsushita et al.

[11] Patent Number: 5,009,959
[45] Date of Patent: Apr. 23, 1991

[54] FLUORINE RESIN COATED ARTICLE

[75] Inventors: Nobutaka Matsushita; Hiroshi Okazaki; Shosuke Yamanouchi; Yoshitaka Osawa; Isao Tsujigaito, all of Osaka, Japan

[73] Assignee: Sumitomo Electric Industries Ltd., Osaka, Japan

[21] Appl. No.: 354,563

[22] Filed: May 22, 1989

[30] Foreign Application Priority Data

May 20, 1988 [JP] Japan .................. 63-124466

[51] Int. Cl.⁵ .................. B32B 17/06; B32B 15/08
[52] U.S. Cl. .................. 428/419; 428/421; 428/422; 428/463; 428/473.5
[58] Field of Search .................. 428/422, 35.9, 421, 428/461, 463, 457, 473.5, 419, 324; 524/505, 431; 204/38.1

[56] References Cited

U.S. PATENT DOCUMENTS

| 3,664,888 | 5/1972 | Oga et al. | 204/38.1 |
| 4,122,226 | 10/1978 | Vassiliou | 428/422 X |
| 4,409,354 | 10/1983 | Namba et al. | 524/431 |
| 4,734,303 | 3/1988 | Fujiwara et al. | 428/35.9 |
| 4,748,169 | 5/1988 | Izutsu et al. | 524/505 X |

FOREIGN PATENT DOCUMENTS 2244791 4/1975 France.
2317343 2/1977 France.

Primary Examiner—Thomas J. Herbert
Attorney, Agent, or Firm—Sughrue, Mion, Zinn Macpeak & Seas

[57] ABSTRACT

A fluorine resin coated article comprising a metal substrate coated with a composition comprising a fluorine resin containing (a) a polyamideimide resin, a polyimide resin, a polyphenylene sulfide resin, a polyethersulfone resin or a mixture thereof in an amount of at least 0.5 wt % based on the amount of the fluorine resin, and (b) mica in an amount of at least 0.5 wt % based on the amount of the fluorine resin.

10 Claims, 1 Drawing Sheet

FLUORINE RESIN COATED ARTICLE

FIELD OF THE INVENTION

The present invention relates to a fluorine resin coated article that has markedly improved wear resistance and which hence is suitable for use in cooking utensils.

BACKGROUND OF THE INVENTION

Because of their high degree of nonstickiness and high chemical resistance, fluorine resins have been used extensively in cooking utensils (e.g. frypans, pots, cooking plates, the inner container of jar type rice cookers, etc.) and in such industrial fields as the food industry, electric industry and mechanical industry.

A common method for coating metal (e.g., aluminum) substrates with fluorine resins consists of roughening the surface of the substrate such as by blasting, applying an undercoat (primer) to the substrate and depositing a topcoat of a fluorine resin which will adhere strongly to the metal substrate by the bonding action of the primer coating (the primer method as described, e.g., in JP-B-62-5466). (The term "JP-B" as used herein means an "examined Japanese patent publication").

Alternatively, tiny cavities resembling octopus traps are formed in the surface of the substrate and a coating of fluorine resin is applied so that it will adhere mechanically to the substrate through the "anchor effect" of the cavities (the etching method as described, e.g., in JP-B-56-35516).

The so prepared fluorine resin coated articles have such low resistance to wear by metals that they are not ideal for use in applications that require high wear resistance such as frypans, pots and cooking plates. To deal with this problem, several proposals have been made, including: coating with a mixture of a fluorine resin with ceramic powder and/or metallic powder; thermal spraying ceramic powder and/or metallic powder onto an aluminum substrate to form a hard coating on the aluminum surface and then coating it with a fluorine resin; and roughening the surface of an aluminum substrate by etching, forming a hard coating on the roughened surface by anodization, and coating it with a fluorine resin.

These methods, however, have proved to be still ineffective in providing fluorine resin coated articles with high wear resistance at elevated temperatures (hereinafter sometimes referred to as "hot wear resistance").

SUMMARY OF THE INVENTION

An object, therefore, of the present invention is to provide a fluorine resin coated article that has improved wear resistance at elevated temperatures.

Other objects and effects of the present invention will be apparent from the following description.

The objects of the present invention can be attained by a fluorine resin coated article comprising a metal substrate coated with a composition comprising a fluorine resin containing (a) a polyamideimide resin (PAI), a polyimide resin (PI), a polyphenylene sulfide resin (PPS), a polyethersulfone resin (PES) or a mixture thereof in an amount of at least 0.5 wt % based on the amount of the fluorine resin, and (b) mica in an amount of at least 0.5 wt % based on the amount of the fluorine resin.

DETAILED DESCRIPTION OF THE INVENTION

Figure 1:
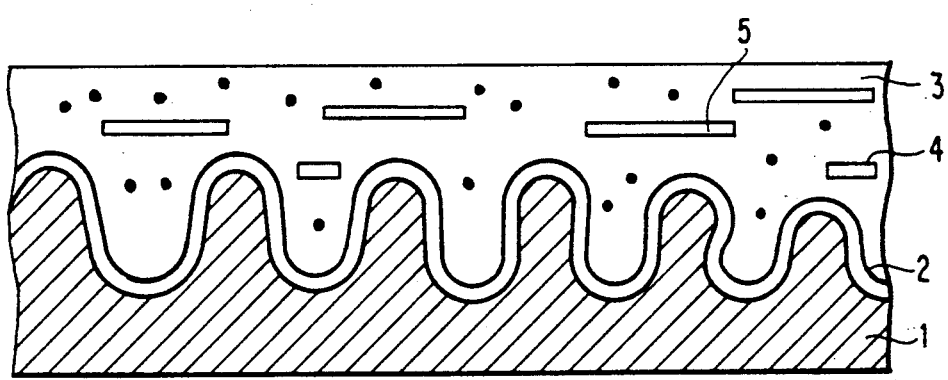
FIG. 1 shows in cross section the basic structure of the fluorine reisn coated article of the present invention.

The present invention involves at least the following preferred embodiments (1) to (7):

(1) a fluorine resin coated article according to the present invention which comprises a metal substrate coated with a composition comprising a fluorine resin containing (a) a polyamideimide resin in an amount of from 0.5 to 10 wt % based on the amount of the fluorine resin and (b) mica in an amount of from 0.5 to 10 wt % based on the amount of the fluorine resin;

(2) a fluorine resin coated article as in the above embodiment (1) which comprises a metal substrate coated with a composition comprising a fluorine resin containing (a) a polyamideimide resin in an amount of from 1 to 10 wt % based on the amount of the fluorine resin and (b) mica in an amount of from 1 to 10 wt % based on the amount of the fluorine resin;

(3) a fluorine resin coated article as in the above embodiment (2) which comprises a metal substrate coated with a composition comprising a fluorine resin containing (a) a polyamideimide resin in an amount of from 3 to 7 wt % based on the amount of the fluorine resin and (b) mica in an amount of from 3 to 7 wt % based on the amount of the fluorine resin;

(4) a fluorine resin coated article as in the above embodiment (3) which comprises a metal substrate coated with a composition comprising a fluorine resin containing (a) a polyamideimide resin in an amount of from 4 to 6 wt % based on the amount of the fluorine resin and (b) mica in an amount of from 4 to 6 wt % based on the amount of the fluorine resin;

(5) a fluorine resin coated article according to the present invention, wherein the fluorine resin is tetrafluoroethylene reisn;

(6) a fluorine resin coated article according to the present invention, wherein the metal substrate is aluminum or an aluminum alloy.

(7) A fluorine resin coated article as in the above embodiment (6), wherein tiny asperities are formed on the surface of the metal substrate by electrochemical or chemical etching.

The main thrust of the present invention lies in the fact that mica and a polyamideimide resin, a polyimide resin, a polyphenylene sulfide resin or a polyethersulfone resin or a mixture thereof are both dispersed in a fluorine resin matrix. Because of the synergistic effect of these two additives, the composition of the present invention has proved to exhibit far better hot wear resistance than when only one additive (either non-fluorine resin or mica) is dispersed in the fluorine resin matrix.

To attain the objects of the present invention, mica and a polyamideimide resin, a polyimide resin, a polyphenylene sulfide resin, a polyethersulfone resin or a mixture thereof each must be contained in an amount of at least 0.5 wt % based on the amount of the fluorine resin.

The amounts of mica and a polyamideimide resin, a polyimide resin, a polyphenylene sulfide resin, a polyethersulfone resin or a mixture thereof each are preferably from 0.5 to 10 wt %, more preferably from 3 to 7 wt %, and most preferably from 4 to 6 wt %, based on the amount of the fluorine resin.

The present inventors have found that wear resistance at elevated temperatures can be further improved by incorporating from 1 to 10 wt %, more preferably from 3 to 7 wt %, and most preferably from 4 to 6 wt %, based on the amount of the fluorine resin of each of a polyamideimide resin and mica in the fluorine resin.

For use in applications where a high degree of non-stickiness is required, the coating layer of the fluorine resin composition according to the present invention may be overlaid with a second layer of fluorine resin that is substantially free of a filler.

Examples of the fluorine resin that can be used in the present invention include polytetrafluoroethylene (PTFE), tetrafluoroethylene-hexafluoropropylene copolymer (FEP), tetrafluoroethylene-perfluoroalkylvinylether (PFA), ethylene-tetrafluoroethylene copolymer (ETFE), polychlorotrifluoroethylene (PCTFE) and ethylene-chlorotrifluoroethylene copolymer (ECTFE).

These fluorine resins may be used not only in the form of powder but also in various other forms including aqueous dispersions of fluorine resin prepared by emulsion polymerization, dispersions having a fluorine resin powder dispersed in aqueous media, organosols of fluorine resin, and emulsions of organosol in water.

A polyamideimide resin that may be used as an additive to the fluorine resin matrix in the present invention is characterized by having both an amide bond and an imide bond in the molecular structure and may be prepared by various methods including reaction between an aromatic diamine having an amide group in the molecule and an aromatic tetravalent carboxylic acid such as pyromellitic acid, reaction between an aromatic trivalent carboxylic acid such as trimellitic anhydride and a diamine such as 4,4'-diaminodiphenylethe, and reaction between a dibasic acid having an aromatic imide ring in the molecule and a diamine.

Mica is available in many types depending upon the constituent elements and the principal types include muscovite ($K_2Al_4(Si_3Al)_2O_{20}(OH)_4$), phlogopite ($K_2Mg_6(Si_3Al)_2O_{20}(OH)_4$) and biotite ($K_2(MgFe^{2+})_6(Si_3Al)_2O_{20}(OH)_4$). Any of these types of mica may be used in the present invention. Mica having an average long axis diameter of from 20 to 200 μm is preferably used in the present invention.

The wear resistance of a fluorine resin at elevated temperatures cannot be improved if mica alone is incorporated in the resin. The intended purpose of the present invention also cannot be attained if a polyamideimide resin, a polyimide resin, a polyphenylene sulfide resin or a polyethersulfone resin or a mixture thereof is solely contained in the fluorine resin. The main thrust of the present invention lies in the fact that both mica and a polyamideimide resin, a polyimide resin, a polyphenylene sulfide resin or a polyethersulfone resin or a mixture thereof are contained in a fluorine resin, and the synergistic effect of these two additives contributes to a marked improvement in the hot wear resistance of the fluorine resin. A plausible reason for this improvement will be mentioned in Example 1 that is described below.

The following examples are provided for the purpose of further illustrating the present invention but are in no way to be taken as limiting.

EXAMPLE 1

Aluminum sheets with a thickness of 2 mm (ASB made by Kobe Steel, Ltd.) were subjected to electrochemical etching at 60 C/cm² in aqueous sodium chloride to form fine asperities on the surface. the etched surfaces of the substrates were anodized in 15% sulfuric acid at 15 volts for 5 minutes to form a hard surface layer.

Resin compositions consisting of a fluorine resin (PTFE made by Daikin Industries, Ltd. under the trade name "EK-630 OCR-H"), a polyamideimide resin (PAI made by Mitsubishi Chemical Industries, Ltd. under the trade name "Torlon") and mica (muscovite made by Merck Japan under the trade name "Iriogin 163" having an average long axis diameter of from 20 to 200 μm) in the proportions shown in Table 1 were applied to the hard surface layer in a thickness of about 35 μm, and dried and sintered at 380° C. for 15 minutes. The structure of the samples thus prepared is shown in FIG. 1, in which 1 is the Al substrate, 2 is the anodized film, 3 is the fluorine resin, 4 is the PAI resin dispersed in the fluorine resin, and 5 is the mica also dispersed in the fluorine resin.

In order to evaluate the hot wear resistance of these samples, a rotary wear test was conducted at 200° C. using a stainless steel (SUS) brush. The test procedures were as follows: a test piece of 100 mm in diameter was stamped from each sample; the coated surface of the test piece was heated to 200° C.; a stainless steel brush (trade name: Haipikaron Jumbo Tawashi #60) was pressed against the coated surface under a load of 2 kg; the brush was rotated at 200 rpm until the aluminum surface with metallic gloss became exposed. The number of revolutions required to attain this state was counted and is shown in Table 1. The data given in Table 1 shows that comparative sample 1—1 having only PAI dispersed in PTFE and comparative sample 1-2 having only mica dispersed in PTFE were inferior in hot wear resistance to the sample of Example 1 in which both PAI and mica were dispersed in PTFE. The superior hot wear resistance of the sample of Example 1 would be explained by the fact that the mica adhered strongly to PTFE by means of PAI.

TABLE 1

| | Contents of PAI and mica in PTFE (wt %) | | Hot wear resistance |
| --- | --- | --- | --- |
| | PAI | mica | (no. of revolutions) |
| Example 1 | 4 | 5 | 60,000 |
| Comparative Example 1 | 4 | 0 | 5,000 |
| Comparative Example 2 | 0 | 5 | 5,000 |

The same experiments were conducted with varying amounts of PAI and mica being dispersed in PTFE. the results are summarized in Table 2, from which one can see that at least 0.5 wt % each of PAI and mica is preferably contained in PTFE in order to attain good results.

TABLE 2

| Contents of PAI and mica in PTFE (wt %) | | Hot wear resistance (no. revolutions) |
| --- | --- | --- |
| PAI | mica | |
| 4 | 0.1 | 5,000 |
| 4 | 0.5 | 20,000 |
| 4 | 1.0 | 40,000 |
| 4 | 5.0 | 60,000 |
| 4 | 10.0 | 45,000 |
| 4 | 15.0 | 20,000 |
| 0.1 | 5.0 | 5,000 |
| 0.5 | 5.0 | 25,000 |
| 1.0 | 5.0 | 35,000 |
| 4.0 | 5.0 | 60,000 |
| 10.0 | 5.0 | 50,000 |
| 15.0 | 5.0 | 15,000 |

EXAMPLES 2–5

The procedures of Example 1 were repeated except that PAI was replaced by a polyimide resin (PI made by Mitsubishi Chemical Industries, Ltd. under the trade name "Polyimide 2080"), a polyphenylene sulfide resin (PPS made by Phillips Petroleum Inc. under the trade name "Rayton R"), a polyethersulfone resin (PES made by ICI Inc. under the trade name "PES 200P") and mixtures of PI and PES. The results are summarized in Tables 3 and 4.

TABLE 3

| | Contents of additives in PTFE (wt %) | | Hot wear resistance (no. of revolutions) |
| --- | --- | --- | --- |
| | PI | mica | |
| Example 2 | 4 | 5 | 50,000 |
| Comparative Example 2-1 | 4 | 0 | 3,000 |
| Comparative Example 2-2 | 0 | 5 | 3,000 |
| | PPS | mica | |
| Example 3 | 4 | 5 | 45,000 |
| Comparative Example 3-1 | 4 | 0 | 3,000 |
| Comparative Example 3-2 | 0 | 5 | 2,000 |
| | PES | mica | |
| Example 4 | 4 | 5 | 45,000 |
| Comparative Example 4-1 | 4 | 0 | 2,000 |
| Comparative Example 4-2 | 0 | 5 | 2,000 |
| | PI + PES | | mica | |
| Example 5 | 2 | 2 | 5 | 45,000 |
| Comparative Example 5-1 | 2 | 2 | 0 | 3,000 |
| Comparative Example 5-2 | 2 | 2 | 5 | 2,000 |

TABLE 4

| Contents of additives in PTFE (wt %) | | Hot wear resistance (no. of revolutions) |
| --- | --- | --- |
| PI | mica | |
| 4.0 | 0.1 | 3,000 |
| 4.0 | 0.5 | 15,000 |
| 4.0 | 1.0 | 30,000 |
| 4.0 | 5.0 | 50,000 |
| 4.0 | 10.0 | 35,000 |
| 4.0 | 15.0 | 15,000 |
| 0.1 | 5.0 | 3,000 |
| 0.5 | 5.0 | 15,000 |
| 1.0 | 5.0 | 30,000 |
| 4.0 | 5.0 | 50,000 |
| 10.0 | 5.0 | 35,000 |
| 15.0 | 5.0 | 10,000 |
| PPS | mica | |
| 4.0 | 0.1 | 3,000 |
| 4.0 | 0.5 | 10,000 |
| 4.0 | 1.0 | 20,000 |
| 4.0 | 5.0 | 45,000 |
| 4.0 | 10.0 | 30,000 |
| 4.0 | 15.0 | 10,000 |
| 0.1 | 5.0 | 2,000 |
| 0.5 | 5.0 | 10,000 |
| 1.0 | 5.0 | 25,000 |
| 4.0 | 5.0 | 45,000 |
| 10.0 | 5.0 | 35,000 |
| 15.0 | 5.0 | 15,000 |
| PES | mica | |
| 4.0 | 0.1 | 2,000 |
| 4.0 | 0.5 | 10,000 |
| 4.0 | 1.0 | 20,000 |
| 4.0 | 5.0 | 45,000 |
| 4.0 | 10.0 | 35,000 |
| 4.0 | 15.0 | 10,000 |
| 0.1 | 5.0 | 2,000 |
| 0.5 | 5.0 | 10,000 |
| 1.0 | 5.0 | 25,000 |
| 4.0 | 5.0 | 45,000 |
| 10.0 | 5.0 | 35,000 |
| 15.0 | 5.0 | 15,000 |
| PI + PES* | mica | |
| 4.0 | 0.1 | 3,000 |
| 4.0 | 0.5 | 15,000 |
| 4.0 | 1.0 | 30,000 |
| 4.0 | 5.0 | 45,000 |
| 4.0 | 10.0 | 30,000 |
| 4.0 | 15.0 | 10,000 |
| 0.1 | 5.0 | 2,000 |
| 0.5 | 5.0 | 10,000 |
| 1.0 | 5.0 | 30,000 |
| 4.0 | 5.0 | 45,000 |
| 10.0 | 5.0 | 35,000 |
| 15.0 | 5.0 | 15,000 |

*The ratios of PI to PES were 1/1 by weight.

The data given in Tables 3 and 4 shows that fluorine resin compositions containing mica in combination with a polyimide resin (PI), a polyphenylene sulfide resin (PPS), a polyethersulfone resin (PES) or a mixture of polyimide and polyethersulfone resins (PI+PES) are also improved in hot wear resistance. For attaining good results, the preferred amount of the additives would be at least 0.5 wt % for each of mica and PI, PPS, PES or PI+PES. The improvement in hot wear resistance was particularly great when each of PAI (polyamideimide) and mica was incorporated in a fluorine resin in an amount of from 1 to 10 wt %.

As described herein and demonstrated in the examples, the present invention provides a fluorine resin coated article that is markedly improved in hot wear resistance by applying a coating of fluorine resin having dispersed therein both mica and a polyamideimide resin, a polyimide resin, a polyphenylene sulfide resin or a polyethersulfone resin or a mixture thereof. The resulting article is suitable for use in applications that require high wear resistance at elevated temperatures such as in cooking utensils exemplified by frypans, pots, cooking plates and the inner container of jar type rice cookers. For use in applications where a high degree of nonstickiness is required, the coating layer of the above-described fluorine resin composition may be overlaid with a second layer of fluorine resin that is substantially free of a filler.

While the invention has been described in detail and with reference to specific embodiments thereof, it will be apparent to one skilled in the art that various changes and modifications can be made therein without departing from the spirit and scope thereof.

What is claimed is:

1. A fluorine resin coated article comprising a metal substrate coated with a composition comprising a fluorine resing containing (a) a polyamideimide resin, a polyimide resin, a polyphenylene sulfide resin, a polyethersulfone resin or a mixture thereof in an amount of from 0.5 to 10 wt % based on the amount of said fluorine resin, and mica in an amount of from 0.5 to 10 wt % based on the amount of said fluorine resin.

2. A fluorine resin coated article as claimed in claim 1 which comprises a metal substrate coated with a composition comprising a fluorine resin containing (a) a polyamideimide resin, a polyimide resin, a polyphenylene sulfide resin, a polyethersulfone resin or a mixture thereof in an amount of from 3 to 7 wt % based on the amount of said fluorine resin, and (b) mica in an amount of from 3 to 7 wt % based on the amount of said fluorine resin.

3. A fluorine resin coated article as claimed in claim 2 which comprises a metal substrate coated with a composition comprising a fluorine resin containing (a) a polyamideimide resin, a polyimide resin, a polyphenylene sulfide resin, a polyethersulfone resin or a mixture thereof in an amount of from 4 to 6 wt % based on the amount of said fluorine resin, and (b) mica in an amount of from 4 to 6 wt % based on the amount of said fluorine resin.

4. A fluorine resin coated article as claimed in claim 1 which comprises a metal substrate coated with a composition comprising a fluorine resin containing (a) a polyamideimide resin in an amount of from 0.5 to 10 wt % based on the amount of said fluorine resin and (b) mica in an amount of from 0.5 to 10 wt % based on the amount of said fluorine resin.

5. A fluorine resin coated article as claimed in claim 4 which comprises a metal substrate coated with a composition comprising a fluorine resin containing (a) a polyamideimide resin in an amount of from 1 to 10 wt % based on the amount of said fluorine resin and (b) mica in an amount of from 1 to 10 wt % based on the amount of said fluorine resin.

6. A fluorine resin coated article as claimed in claim 5 which comprises a metal substrate coated with a composition comprising a fluorine resin containing (a) a polyamideimide resin in an amount of from 3 to 7 wt % based on the amount of said fluorine resin and (b) mica in an amount of from 3 to 7 wt % based on the amount of said fluorine resin.

7. A fluorine resin coated article as claimed in claim 6 which comprises a metal substrate coated with a composition comprising a fluorine resin containing (a) a polyamideimide resin in an amount of from 4 to 6 wt % based on the amount of said fluorine resin and (b) mica in an amount of from 4 6 wt % based on the amount of said fluorine resin.

8. A fluorine resin coated article as claimed in claim 1, wherein said fluorine resin is tetrafluoroethylene reisn.

9. A fluorine resin coated article as claimed in claim 1, wherein said metal substrate is aluminum or an aluminum alloy.

10. A fluorine resin coated article as claimed in claim 9, wherein tiny asperities are formed on the surface of said metal substrate by electrochemical or chemical etching.

* * * * *